No. 666,242.  
J. E. CARROLL.  
METHOD OF DISTILLATION.  
(Application filed Mar. 31, 1900.)
Patented Jan. 15, 1901.
(No Model.)
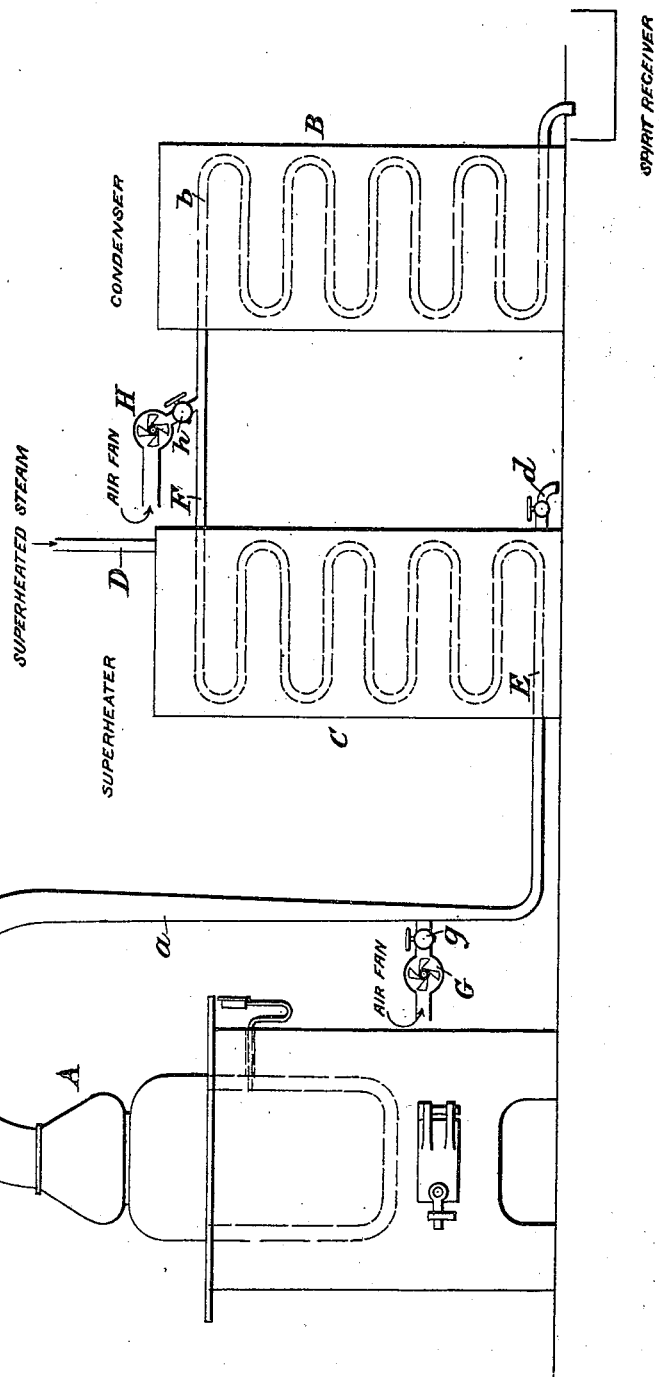
WITNESSES:
INVENTOR
BY
ATTORNEY

UNITED STATES PATENT OFFICE.

JAMES EDMUND CARROLL, OF LONDON, ENGLAND.

METHOD OF DISTILLATION.

SPECIFICATION forming part of Letters Patent No. 666,242, dated January 15, 1901.

Original application filed January 30, 1899, Serial No. 703,881. Divided and this application filed March 31, 1900. Serial No. 10,878. (No specimens.)

*To all whom it may concern:*

Be it known that I, JAMES EDMUND CARROLL, a citizen of the United States of America, and a resident of London, county of Middlesex, England, (post-office address 41 Eastcheap, London, E. C.,) have invented certain new and useful Improvements in Methods of Distillation, of which the following is a specification.

My invention relates to a new and improved method for treatment of spirits whereby the spirituous vapor is treated intermediate the still and condenser, so as to produce therein a chemical change similar to that effected by time, so that when the vapor is condensed into the form of liquid spirit it will possess the quality of time-aged spirit and be capable of use as such, the said invention being a part of the subject-matter of a former application filed January 30, 1899, Serial No. 703,881, and of which this application is a division.

New spirit intended to be used as a beverage is at first not potable on account of its harsh and disagreeable taste and odor and is, moreover, unwholesome. It has been proposed to remedy these defects and to produce in new spirit the effect of age by removing from it certain deleterious substances usually referred to as "fusel-oils," and this has been accomplished or said to have been accomplished in various ways.

It is an acknowledged fact that the action of time will remedy the defects in and will change a crude, harsh, and unwholesome spirit into an acceptable beverage. My invention accomplishes this in the process of distillation by the action of added heat upon the spirituous vapor, said vapor being so treated between the still and the condenser, and by my improved process I produce spirituous liquors in the first instance possessing the characteristics and the mellow and desirable properties found in similar spirituous liquor after remaining in cask for a number of years. This I attribute to the fact that by my process a chemical change is effected in the spirituous vapor, which change is similar to that otherwise produced in the spirit by time, and the chemical reactions in new spirits made according to my process resemble those of such old spirit, as also does the taste, appearance, and smell. I do not claim to remove any substances from the spirituous liquor, but to effect a chemical change in the spirituous vapor by treating it before condensation, so that the presence of the objectionable substances, if they be present after treatment, is no more apparent than in the time-aged liquor, thus presenting in the treated spirit all the indications of age and consequent improvement in commercial value.

The operation of distillation and condensation is well known, and my invention is not limited to the use of any particular form or construction of apparatus.

A still and condenser being provided, I interpose between these two well-known pieces of apparatus a tank or chamber through which passes a coil connected directly with the still at one end and with the condenser at the other. I also provide a source of heat, which may be, as indicated, superheated steam, for heating the tank, and thereby heating the said supplemental or superheating coil and the vapor therein to the required temperature. A device for introducing air or other gases to the coil entering the tank is also provided, together with a second device for introducing air or gas to the other end of the coil issuing therefrom, either or both of which can be used or not, as desired. Ordinarily a coil of thin copper tubing is employed in connection with the distillation of spirits; but it is a singular fact incident to my invention that the superheated spirituous vapor will attack a copper tube and impart a metallic taste to the distillate, so that in practice I line the superheating-tube and the condenser-tube, if necessary, with a coating of silver, although of course any other equivalent metal or material may be used.

The accompanying drawing is a diagrammatic representation of apparatus capable of carrying out my invention, in which—

A represents a conventional form of still.

B is the condenser, which is provided with a worm $b$, which is surrounded with water or other cooling medium in the usual manner.

C is, for convenience, a tank resembling the condenser B and intermediate said condenser and the still A.

The tank C is closed and is connected by pipe D with a source of superheated steam, that being a convenient method of imparting heat thereto. d is a cock at the lower portion of said tank for removing the water of condensation. A pipe a extends from the still and connects at its lower end with superheating-coil E at the bottom of the tank C. The superheating-coil E may have as many convolutions as desired, the upper convolution being connected by pipe F with the upper end of condensing-coil b, that being a convenient device for the purpose. It is essential that the chemical action produced by the heat on the vapor be prolonged to get good results, the proper period being readily determined by tests made at intervals by taste and smell. To secure this prolonged heating, I prefer the superheating-coil, which, it will be understood, may be of any desired length. An air-fan G is connected with the pipe a, extending between the still and superheating-coil E, and a suitable cock g is interposed between said fan and the coil. A similar fan H is interposed between the upper end of the superheating-coil E and the top coil of the condenser, being similarly provided with a stop-cock h between said fan and the pipe F, so that either of said fans may be caused to supply air to their respective pipes or either or both be shut off, as desired.

In operation the still A is charged and fired in the usual manner, the spirituous vapor passing therefrom through pipe a to the superheating-coil E. As the said spirituous vapor traverses the coil E, the same being enveloped in superheated steam or heated in any other convenient manner, the said spirituous vapor becomes superheated, and the coil E should be of sufficient length for that purpose. In practice I have secured satisfactory results by subjecting the spirituous vapor to a temperature of 350° Fahrenheit; but I do not limit myself to this exact temperature, since the same may be varied within considerable limits without materially affecting the result of the process and without departing from the nature and spirit of my invention. The best temperature for the different spirituous vapors can only be determined in actual practice. For instance, the best results were obtained from spirits made from molasses refuse at about 450° Fahrenheit, while satisfactory results were obtained with both Scotch and American malt whiskies at about 350° Fahrenheit. Having been heated, as described, the spirituous vapor then passes to the condenser and is cooled and reduced to liquid spirits in the well-known manner, and I find that by so heating the spirituous vapor a chemical change is produced therein which is equivalent to and apparently the same as that produced by keeping ordinary raw spirit in a cask for from five to ten years.

It is advantageous to mix atmospheric air with the spirituous vapor before it enters the superheating-coil in quantity sufficient to replace that originally in the still and carried over with the vapor and to superheat the spirituous vapor and air together, in which event the fan G is employed to supply the same.

I find that for practical purposes the admixture of an equal quantity of air with the spirituous vapor is satisfactory, since the vapor takes up only so much thereof as will produce beneficial results. Practically pure oxygen gas may be employed instead of air if desired, both being well known in the art, in connection with ordinary distillation; but when oxygen gas is substituted for air a lesser quantity will suffice. The use of oxygen gas and air is claimed herein only when combined with the alcoholic vapor from the still and superheated therewith before condensation.

An excess of air or oxygen gas will not be taken up by the spirit-vapor, but will pass out at the spirit or distillate discharge. This happening, it merely remains to decrease by the means provided the quantity of air.

While I consider the mixture of atmospheric air or oxygen gas with the spirituous vapor to be of advantage and while there is a further advantage in the employment of the fan G to promote rapidity of circulation, these are not essential, the main feature of my invention consisting in so superheating the spirituous vapor in a non-corrodible receptacle that chemical changes otherwise produced by time are effected in the short period required for the passage of the spirituous vapor through the superheating-coil, during which passage the said vapor attains the desired temperature.

Having described my invention, what I claim is—

1. The improved method of distilling spirits, which consists in subjecting its vapor to a superheating sufficiently prolonged to chemically affect the impurities therein, and then conducting the vapor without a separation of its constituents to a condenser.

2. The herein-described improved method of distilling spirits, which consists in mixing with the spirituous vapor sufficient air or oxygen gas to oxidize the impurities therein, superheating the spirituous vapor until it is chemically affected, and finally condensing.

3. The herein-described method of treating spirits, which consists in mixing with the spirituous vapor after it leaves the still a quantity of atmospheric air or oxygen gas, then superheating the vapor and air or gas until a chemical change is produced in said spirituous vapor similar to that produced by time, and then condensing the vapor to the form of liquid spirits.

Signed by me at New York, N. Y., this 30th day of March, 1900.

JAMES EDMUND CARROLL.

Witnesses:
J. S. DE SELDING,
FRANKLAND JANNUS.